Oct. 29, 1957 S. C. HETH 2,811,006
DIVIDER WITH ROTARY VERTICAL CUTTER
Filed Oct. 7, 1954 2 Sheets-Sheet 1

INVENTOR.
SHERMAN C. HETH
BY

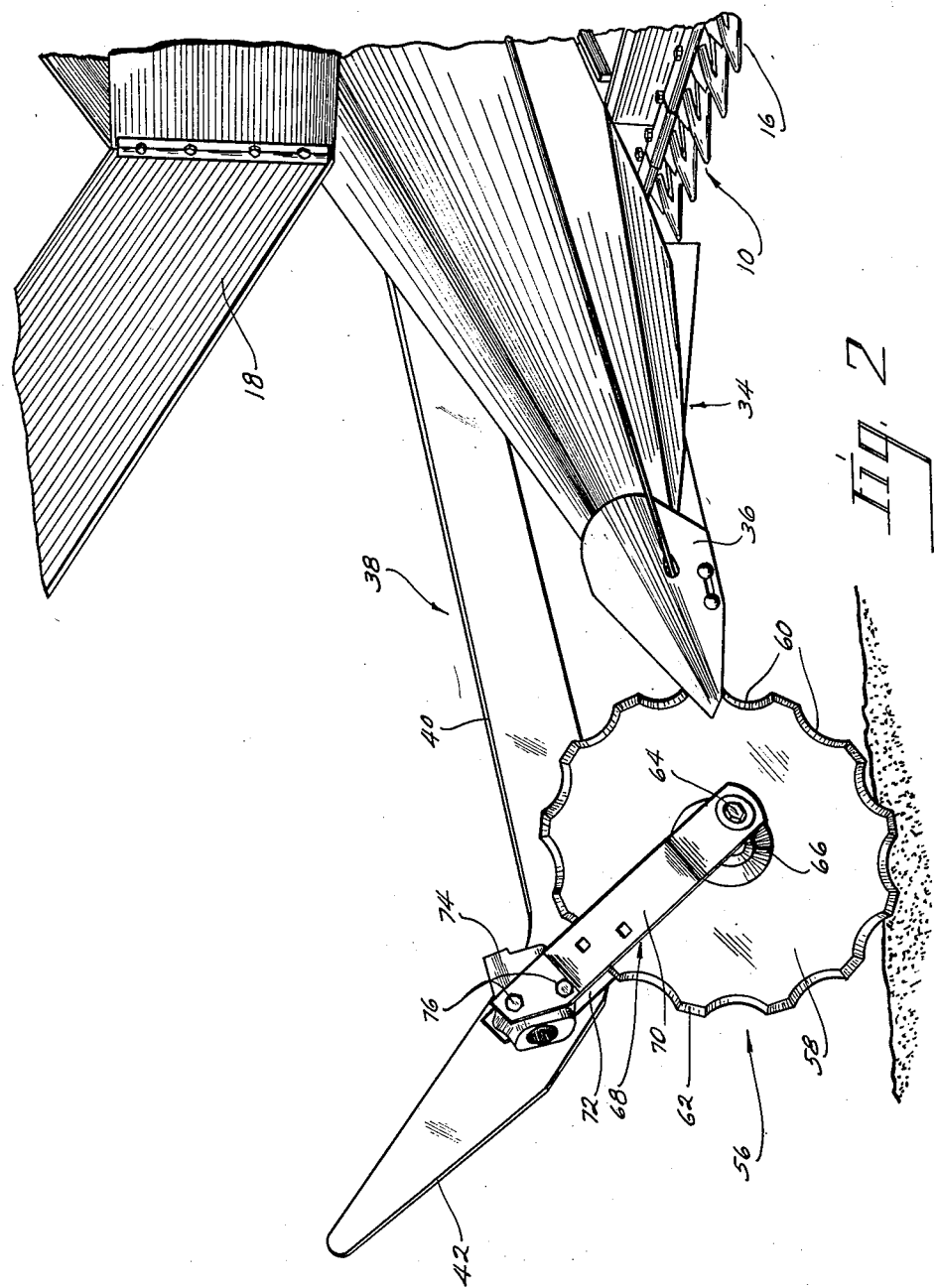

United States Patent Office 2,811,006
Patented Oct. 29, 1957

2,811,006

DIVIDER WITH ROTARY VERTICAL CUTTER

Sherman C. Heth, Racine, Wis., assignor to J. I. Case Company, Racine, Wis., a corporation of Wisconsin Application October 7, 1954, Serial No. 460,894

7 Claims. (Cl. 56—315)

This invention relates to a windrower or similar type of harvester adapted to sever the standing crop from the ground, and especially to the means of preparing damaged or interwoven crop materials, or that which has been beaten down close to the ground by rain or wind, so that it can be cut.

The usual method of lifting damaged or "down" grain, so that it can be severed by the cutter bar, is by the use of a divider point. This device extends forwardly at the end of the cutter bar and separates or "combs" the crop so that a definite line is established between the crop being cut and that to be subsequently harvested. Under normal conditions this device is satisfactory but, when the crop is heavy and badly tangled, the conventional divider point is often unable to separate the fibrous mat of grain, the latter frequently winding itself about the divider point so as to hinder the forward travel of the harvester or often to damage it.

An object of this invention is to provide a divider which will positively separate the crop being cut from that which is to be subsequently harvested.

Another object of this invention is to provide a divider that will cut the crop in its path and thus reduce the work required to traverse the field with the harvester.

Another object is to provide a rolling divider that is ground-driven.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Fig. 2 is a fragmentary view from the opposite side to that of Fig. 1.

Figure 1:
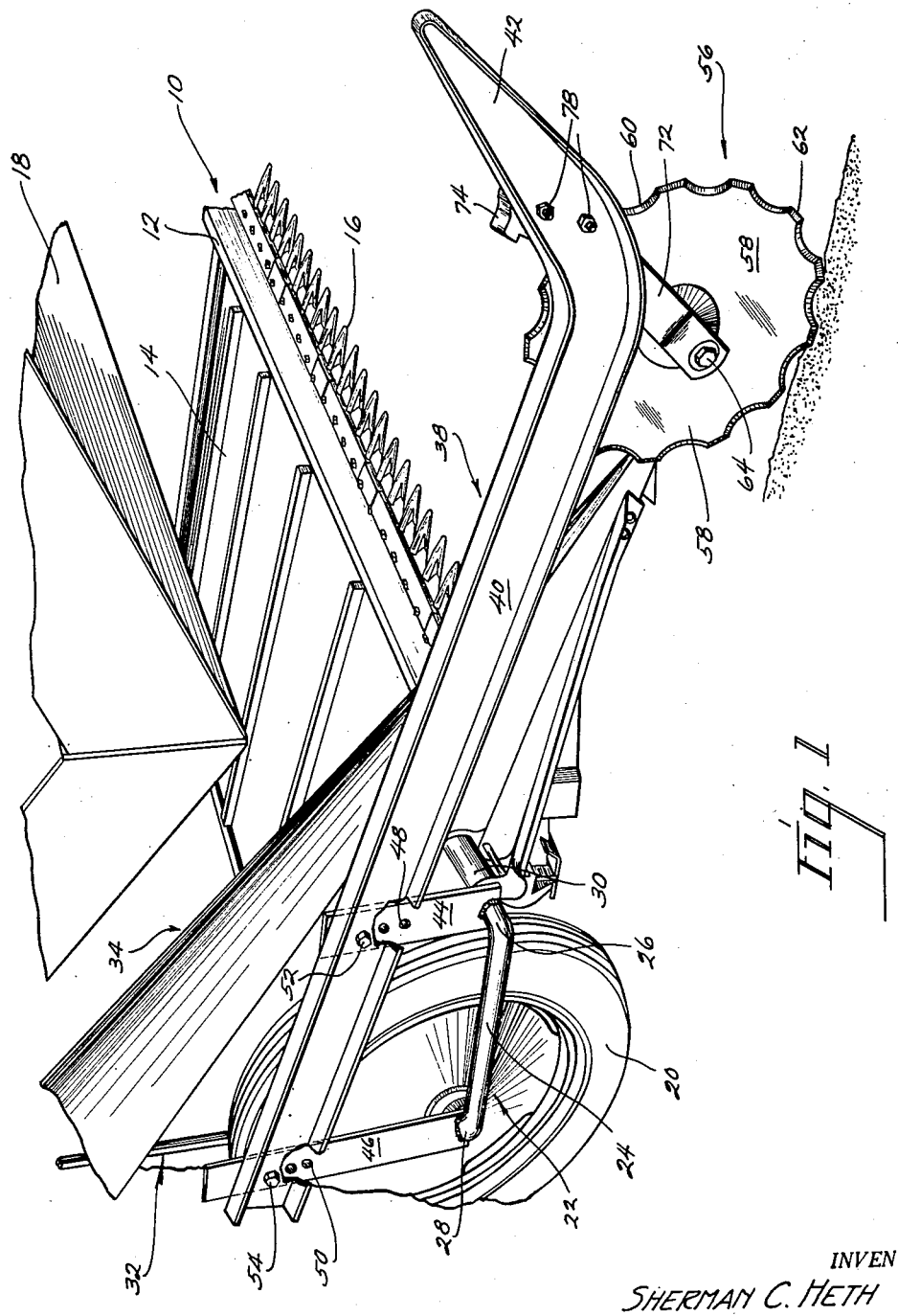
Fig. 1 is a perspective fragmentary front view looking rearwardly and showing the invention applied to a windrower.

Referring to Fig. 1, 10 indicates a fragment of a conventional windrower having a frame 12 and apron 14, a cutter bar 16, reel 18, and a transport wheel 20.

Frame 12 is supported relative to transport wheel 20 by a crank axle 22 which is of a C shape construction having a middle portion 24, a frame pivot portion 26 and a wheel journal portion 28. The frame pivot portion 26 is pivotally carried by frame 12 in a sleeve 30. This arrangement permits the crank axle to rotate within the sleeve 30 and thereby raise and lower the frame 12 relative to the ground. An adjusting mechanism 32, a portion of which is shown, permits the operation of raising and lowering to be performed manually. However, this adjusting mechanism is not a part of this invention, so it will not be described unless necessary in order to further describe the invention.

A conventional divider point 34 is customarily provided for use when the device of this application is not needed, and has a point 36 which is of somewhat heavy material. Divider point 34 is supported on frame 12 in the usual manner and need not be further described.

The invention in this instance is a divider-assembly 38 which is positioned at the outside of the transport wheel 20 and in a generally horizontal direction perpendicular to the cutter bar 16, as shown in Fig. 1.

Divider assembly 38 comprises a channel-shaped member 40 which extends from a point generally over the axis of wheel 20 to a point forwardly of cutter bar 16 and substantially at a right angle to the latter. Channel member 40 has a forward portion 42 which is directed upwardly and forwardly as shown in Figs. 1 and 2, and is provided with a tapered end shown. Channel member 40 is solely supported from crank axle 22 by means which will now be described.

A pair of support members 44 and 46 are secured by welding or other means, to portions 26 and 28 respectively, and extend generally upwardly at right angles to portion 24. Members 44 and 46 lie in one plane and are so positioned that they abut the web of channel member 40, shown in Fig. 1. A plurality of holes, 48 and 50, are provided in members 44 and 46 respectively. In this instance 3 holes are provided in each member. A pair of holes is also provided in channel member 40, so spaced that the channel member 40 can be adjusted to maintain a constant position relative to the ground, by aligning the desired holes 48 and 50 with the holes in member 40 and then inserting bolts 52 and 54. It will be clear that a selection of holes in members 40 and 46 will give a wide range of angular adjustment of channel member 40 relative to the ground. The purpose of this adjustment will be clear as the description progresses.

A rotatable divider means 56 is provided, and is secured to portion 42 of channel member 40.

The rotatable divider comprises a disc 58 of hardened steel which is of a diameter suitable for the purpose. Disc 58 in this instance has concave notches 60 spaced uniformly about the periphery of the disc as shown in Figs. 1 and 2. The portions 62 of the periphery, intermediate the concave notches 60 remain as a portion of the original circumference. The peripheries of notches 60 and portions 62 are sharpened to a cutting edge for reasons which will appear as the description progresses. Disc 58 is rotatably mounted on a bolt journal member 64 which has its axis parallel to the axis of transport wheel 20. A hub 66 provides support for disc 58 and is securely fastened to the disc and provides rigid support therefor. A bifurcated fork member 68 is provided having arms 70 and 72, disposed, one on each side of disc 58. Member 64 is passed through arm 70, hub 66, and arm 72 so as to secure disc 58 and its hub 66 securely in position. Arms 70 and 72 extend upwardly and forwardly and are held apart by a spacer casting 74. A pair of bolts 76 are passed through arms 70 and 72 and spacer casting 74, and finally through portion 42 of channel member 40. A pair of nuts 78 secure this assembly together.

When this device is to be used on a windrower, as shown in Figs. 1 and 2, the cutter bar is adjusted relative to the ground by use of the adjusting mechanism 32 so the proper height of stubble will remain. It is clear that when this adjustment is made, it will also be necessary to adjust the position of the divider means 56 relative to the ground, which is done by selecting the proper holes 52 and 54.

The function of the divider means 56 is to penetrate the ground and to be driven or rotated thereby. When adjustment of divider means 56 has been properly made, the cutting edge of divider disk 56 will sever any stalks of grain which are in its path, thus obtaining a clear-cut division between grain that is to be immediately severed by the cutter bar and that which will be severed in a subsequent passage of the machine.

The purpose of forwardly-and-upwardly-directed portion 42 of channel member 40, is to urge the damaged and tangled crop downwardly to be engaged and severed by the disk 58.

The above being a complete description of an illustrative embodiment of the invention, what is claimed as new and desired to be secured by Letters Patent of the United States is:

1. In a harvester having a transverse platform and a support wheel provided with a crank axle having a pivot on said platform, in combination, a forwardly extending substantially horizontal arm member adjustably secured to said crank axle and having an upwardly and forwardly extending forward portion, a pair of spaced members positioned on said crank axle and extending upwardly and having means to adjustably support said arm for movement in a vertical plane said means comprising providing a series of holes in said spaced members and a plurality of holes in said arm member, and fastening means to secure said arm in selected holes in said members, and a peripherally-notched rotating cutting member mounted on said arm and positioned on a horizontal transverse axis at the forward portion of said arm and drivingly engaging the ground over which the harvester travels.

2. In a harvester having a transverse grain platform and a support wheel provided with a crank axle having a pivot on said platform, in combination, a forwardly extending arm member adjustably secured to said crank axle and having an upwardly and forwardly extending forward portion, spaced members integral with said crank axle and extending upwardly and having means to adjustably support said arm member in a vertical plane said means comprising providing a plurality of holes in one of said spaced means and at least one hole in the other and cooperating holes in said arm, and fastening means for insertion selectively in said holes, and a notched rotating cutting disc member mounted on said arm and positioned at the forward portion of said arm member and drivingly engaging the ground over which the harvester travels.

3. In a harvester having a transverse grain platform and a support wheel provided with a crank axle having a pivot on said platform, in combination, a forwardly extending arm member carried by said crank axle and having an upwardly and forwardly extending forward portion, means on said crank axle extending upwardly to support said arm member for adjustment in a vertical plane relative to said crank axle, a notched rotating member mounted on said arm and positioned at the forward portion of said arm and drivingly engaging the ground over which the harvester travels.

4. In a harvester having a platform and a support wheel provided with a crank axle having a pivot on said platform, in combination, a forwardly extending arm carried by said crank axle, means on said crank axle to adjustably support said arm relative to said pivot and a rotating member mounted on said arm and positioned on said arm forwardly of said wheel with the axis of said rotating member positioned transversely to the direction of travel, and in driving engagement with the ground over which the harvester travels.

5. In a harvester having a platform and a support means provided with a crank axle having a pivot on said platform, in combination, a forwardly extending arm supported on said crank axle, means on said crank axle to adjustably support said arm relative to said crank axle pivot and a rotating disc member mounted on said arm and positioned forwardly of said support means on said arm with the axis of said disc member directed transversely to the direction of travel of said harvester and in driving relation with the ground.

6. In a harvester having a transverse platform and a frame, upwardly-extending forward and rearward support members on said frame, a forwardly-extending substantially-horizontal arm member secured to said support members and having an upwardly extending portion, said support members and said arm member provided with means whereby the arm can be positioned at various angular positions relative to the ground, and a rotating cutting member positioned on said arm on a horizontal axis at a point forwardly of said platform.

7. In a harvester of the type having a transverse platform, a support wheel and a crank axle carried by the wheel and pivotally secured to said harvester for raising and lowering of said harvester by swinging of said axle, the combination of a forwardly extending arm member fixed in relation to said platform and having an upwardly inclined forward portion, means securing said arm member to said axle including upwardly directed spaced members positioned on said crank axle and secured to said arm at longitudinally spaced points thereon, said spaced members each providing a series of holes, and said arm providing a plurality of holes positioned to register with holes in said spaced members, fastening means engaged in said registering holes and a peripherally-notched rotating cutting member pivotally secured to said arm adjacent said upwardly inclined portion on a substantially horizontal transverse axis in position to engage the ground and be rotated thereby, and to cut material lying thereon, and the holes in said arm, with said fastening means removed being registerable with other holes in said spaced members for receiving said fastening means and securing said arm in a different position to provide for a different relation of said cutting member to the ground and for a different position of said crank axle.

References Cited in the file of this patent

UNITED STATES PATENTS

| | | |
|---|---|---|
| 651,626 | Hord | June 12, 1900 |
| 785,173 | King | Mar. 21, 1905 |
| 1,971,866 | McClure et al. | Aug. 29, 1934 |
| 2,154,588 | Stopher | Apr. 18, 1939 |